United States Patent
Tokuchi

(10) Patent No.: US 10,645,240 B2
(45) Date of Patent: May 5, 2020

(54) INFORMATION PROCESSING DEVICE AND NON-TRANSITORY COMPUTER READABLE MEDIUM FOR PROVIDING A NOTIFICATION WHEN A REQUESTED FUNCTION IS NOT PROPERLY EXECUTABLE

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/121,035

(22) Filed: Sep. 4, 2018

(65) Prior Publication Data

US 2019/0245983 A1   Aug. 8, 2019

(30) Foreign Application Priority Data

Feb. 5, 2018   (JP) .................. 2018-018074

(51) Int. Cl.
   *H04N 1/00* (2006.01)

(52) U.S. Cl.
   CPC ....... *H04N 1/0048* (2013.01); *H04N 1/00477* (2013.01)

(58) Field of Classification Search
   None
   See application file for complete search history.

(56) References Cited

U.S. PATENT DOCUMENTS

| 2009/0190147 A1* | 7/2009 | Uruta ............... H04N 1/2307 358/1.9 |
| 2012/0173477 A1* | 7/2012 | Coutts ............... G06F 16/217 707/602 |
| 2014/0244836 A1 | 8/2014 | Goel et al. |

FOREIGN PATENT DOCUMENTS

JP   2016-514398 A   5/2016

* cited by examiner

Primary Examiner — Thomas D Lee
(74) Attorney, Agent, or Firm — Oliff PLC

(57) ABSTRACT

An information processing device includes a receiving unit and a notifying unit. The receiving unit receives an execution request for executing a function for using a device. The notifying unit provides a warning notification in a case where the function is not expected to be properly executable due to an increase in an amount of data handled by the device.

12 Claims, 4 Drawing Sheets

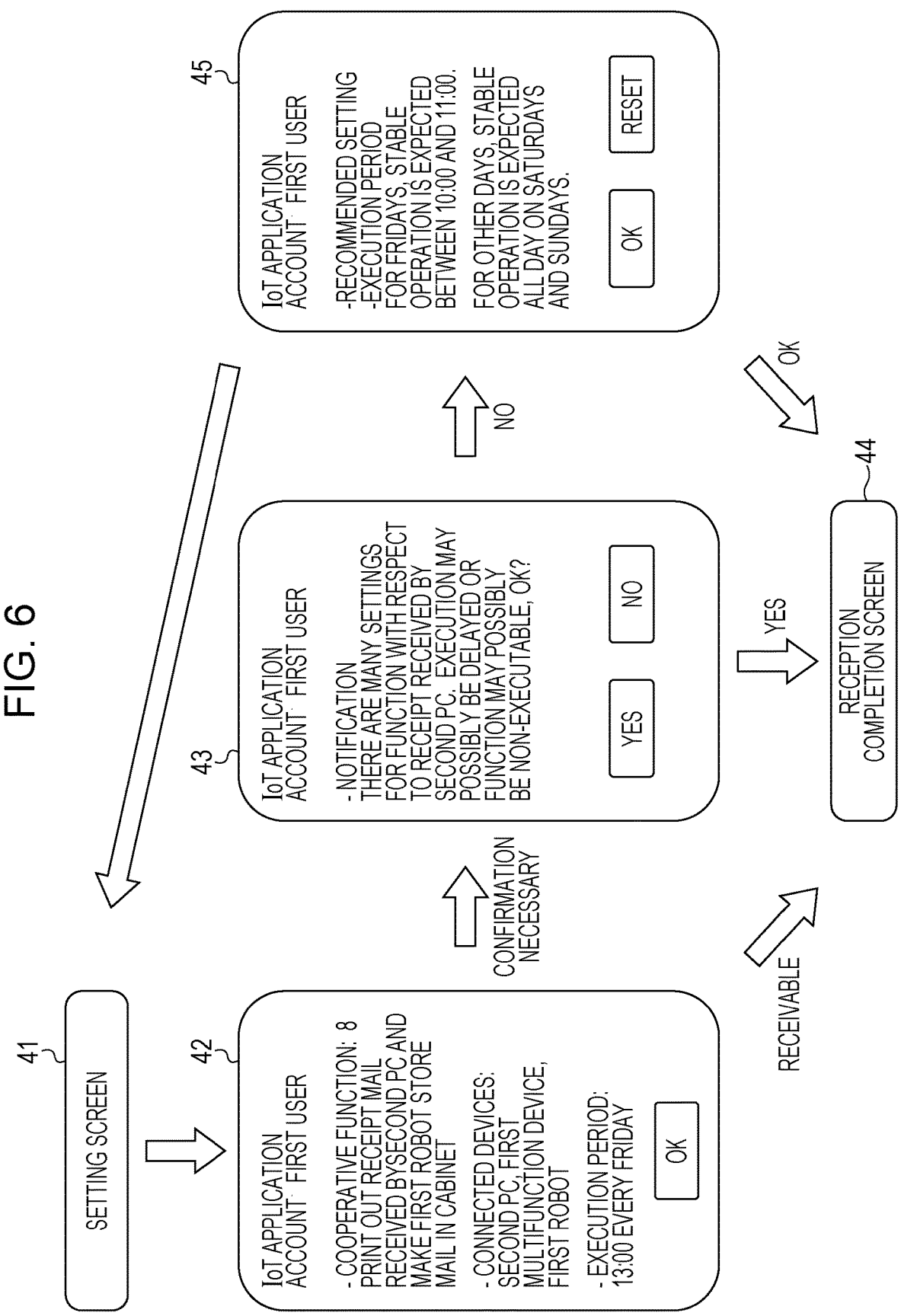

INFORMATION PROCESSING DEVICE AND NON-TRANSITORY COMPUTER READABLE MEDIUM FOR PROVIDING A NOTIFICATION WHEN A REQUESTED FUNCTION IS NOT PROPERLY EXECUTABLE

CROSS-REFERENCE TO RELATED APPLICATIONS

This application is based on and claims priority under 35 USC 119 from Japanese Patent Application No. 2018-018074 filed Feb. 5, 2018.

BACKGROUND

Technical Field

The present invention relates to information processing devices and non-transitory computer readable media.

SUMMARY

According to an aspect of the invention, there is provided an information processing device including a receiving unit and a notifying unit. The receiving unit receives an execution request for executing a function for using a device. The notifying unit provides a warning notification in a case where the function is not expected to be properly executable due to an increase in an amount of data handled by the device.

BRIEF DESCRIPTION OF THE DRAWINGS

An exemplary embodiment of the present invention will be described in detail based on the following figures, wherein:

FIG. 6 illustrates an example of a screen displayed in a terminal making a request for executing a function in accordance with this exemplary embodiment.

DETAILED DESCRIPTION

An exemplary embodiment of the present invention will be described below with reference to the drawings.

Figure 1:
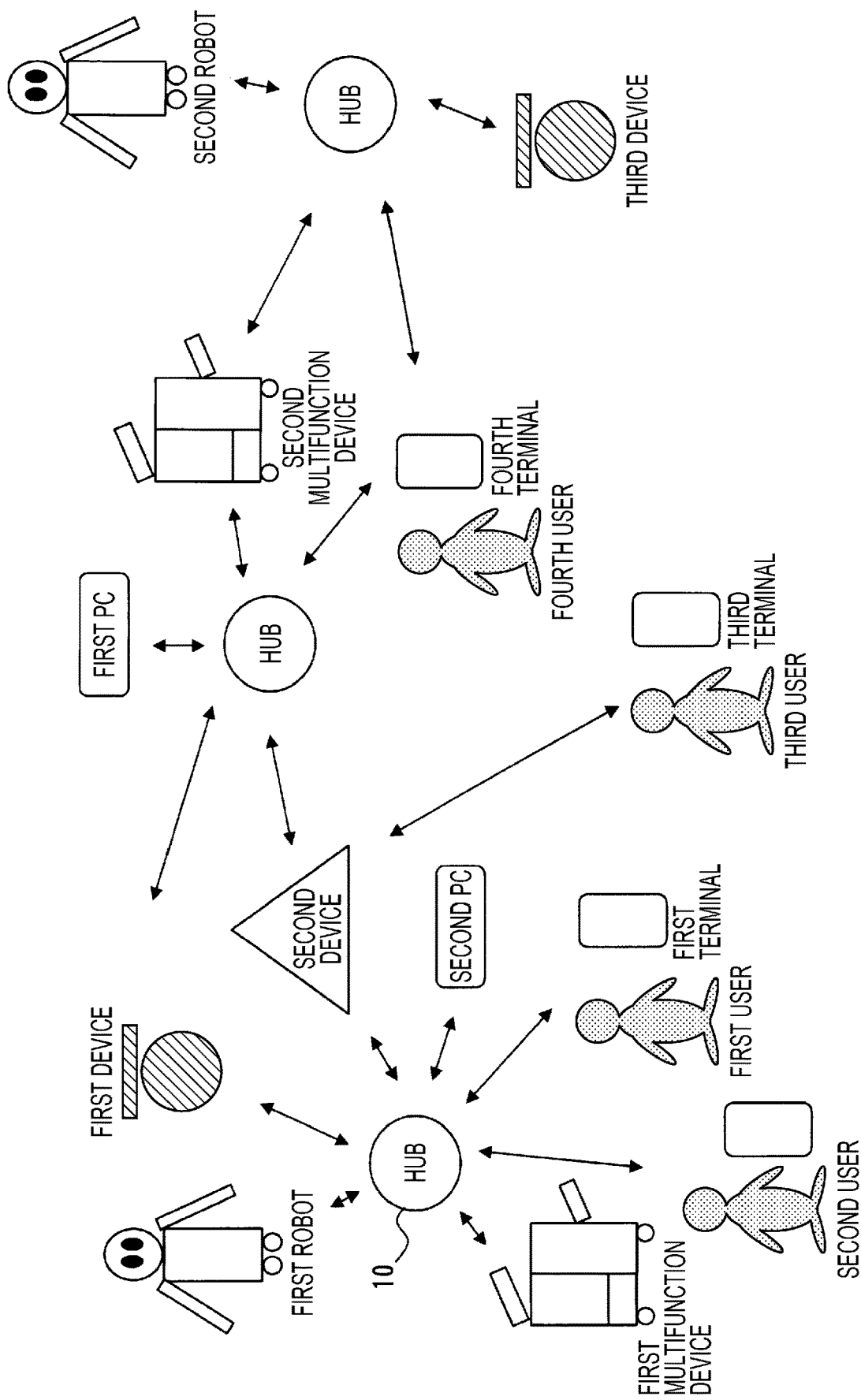
FIG. 1 schematically illustrates the overall configuration of a device network system according to an exemplary embodiment.

FIG. 1 schematically illustrates the overall configuration of a device network system according to this exemplary embodiment. Specifically, FIG. 1 shows multiple types of Internet-of-Things (IoT) devices connected to a network, such as the Internet. For example, in FIG. 1, first and second multifunction devices, first and second robots, first to third devices of various types, first to fourth terminals, and first and second personal computers (PCs) are shown, and these devices are communicable with one another via hubs. There are also devices that are directly communicable with other devices without the intervention of hubs. The hubs are also capable of exchanging data with each other. In this exemplary embodiment, devices connectable to the Internet, including PCs (information terminals), will collectively be referred to as "IoT devices". Moreover, an Iot device may simply be referred to as a "device".

Each multifunction device is an image forming device having an image forming function (i.e., at least one of a scanning function, a printing function, a copying function, and a facsimile function). Each robot may be a humanoid robot as shown in FIG. 1, or may be an animal robot or a robot of another type. Each of the first to third devices is, for example, a projector, a display device such as a liquid crystal display, a recording device, a playback device, an imaging device such as a camera, a clock, a monitoring camera, an automobile, a two-wheeled vehicle, an aircraft (such as an unmanned aircraft (i.e., a so-called drone)), a gaming device, or any of various types of sensing devices (such as a temperature sensor, a humidity sensor, a voltage sensor, or a current sensor). Alternatively, each of the first to third devices may be a household electrical appliance, such as a refrigerator, a rice cooker, a microwave oven, a coffee brewer, a vacuum cleaner, a washing machine, an air conditioner, or a lighting device. Each of the first to fourth terminals in this exemplary embodiment is assumed to be an information terminal that may be carried by a user, such as a smartphone, a tablet PC, or a portable telephone. Similar to the terminals, the first and second PCs are information terminals. The first and second PCs may be of a stationary type or a portable type. The first to fourth terminals and the first and second PCs each have an application (Iot application) installed therein for using the IoT device.

Each of the hubs is a device that relays data by connecting the above-mentioned IoT devices to a network in a wireless or wired manner. Each hub is equipped with an information processing device having a communication interface, at least one processor such as a central processing unit (CPU), a read-only memory (ROM), a random access memory, and a storage unit. The processor reads and executes a program stored in the storage unit so that various types of functions are realized. Although this exemplary embodiment relates to an example where a hub serves as an information processing device that causes a function, which will be described later, to be exhibited, another device, such as a terminal, a PC, or a device whose load is to be monitored, may serve as an information processing device that causes a function, which will be described later, to be exhibited. As another alternative, a server that manages the entire device network system according to this exemplary embodiment may be provided, and the server may cause a function, which will be described later, to be exhibited.

Figure 2:
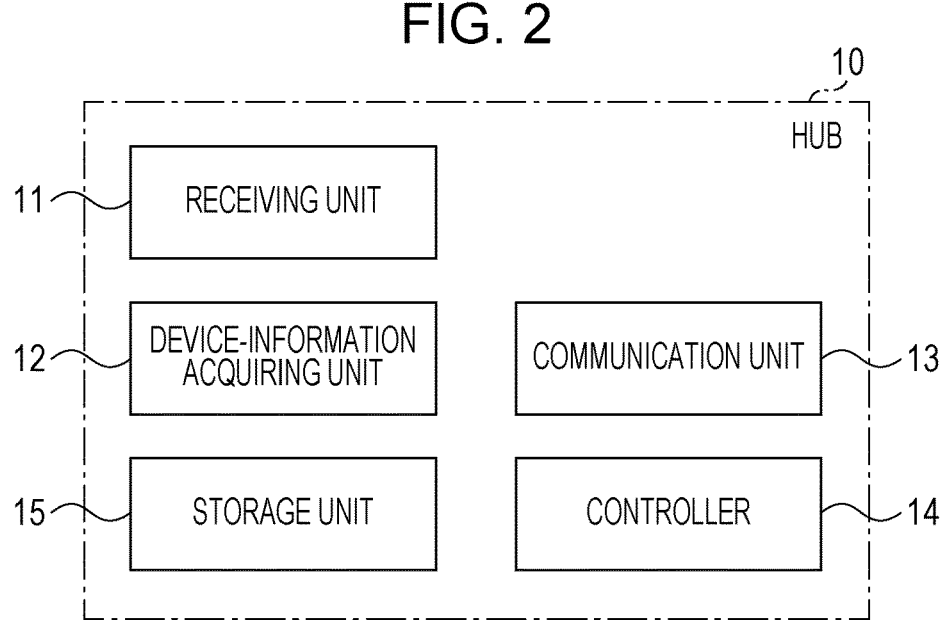
FIG. 2 is a block diagram of a hub according this exemplary embodiment.

FIG. 2 is a block diagram of a hub 10 according to this exemplary embodiment. The hub 10 has a receiving unit 11, a device-information acquiring unit 12, a communication unit 13, a controller 14, and a storage unit 15. Components that are not used for describing this exemplary embodiment are omitted from FIG. 2.

The receiving unit 11 receives, from any of the devices, an execution request for a function to be provided by another device. In the course of receiving the execution request, the receiving unit 11 also presents various types of screens, such as a warning screen, to the device serving as the source of the execution request. The device-information acquiring unit 12 acquires information related to the device. The acquired information is stored in the storage unit 15, where necessary.

The communication unit 13 is a communication interface that functions as a transmitter for transmitting data to another device and also functions as a receiver for receiving data from another device. The communication unit 13 may be a communication interface having a wireless communication function or may be a communication interface having a wired communication function. For example, the communication unit 13 is compliant with one or more types of communication methods and may communicate with a communication partner in accordance with a communication method suitable for the communication partner (i.e., a communication method that the communication partner is compliant with). Examples of the communication methods include infrared communication, visible light communication, Wi-Fi (registered trademark) communication, and short-range wireless communication (such as near field communication (NFC)). Examples of short-range wireless communication used include Felica (registered trademark), Bluetooth (registered trademark), and radio frequency identifier (RFID). Alternatively, wireless communication of another method may be used as short-range wireless communication. For example, the communication unit 13 may change the communication method or the frequency band in accordance with the communication partner, or may change the communication method or the frequency band in accordance with the surrounding environment. The controller 14 controls the operation of each component of the hub 10. The storage unit 15 is a storage device, such as a hard disk drive (HDD) or a memory (e.g., a solid state drive (SSD)), and stores various types of information.

The components 11 to 14 in the hub 10 are realized in accordance with cooperative operation between a computer included in the hub 10 and a program executed by the CPU. The program used in this exemplary embodiment may be provided by a communication unit or may be provided by being stored in a recording medium. The storage unit 15 is realized by the storage device, such as the HDD or the RAM, included in the hub 10.

Figure 3:
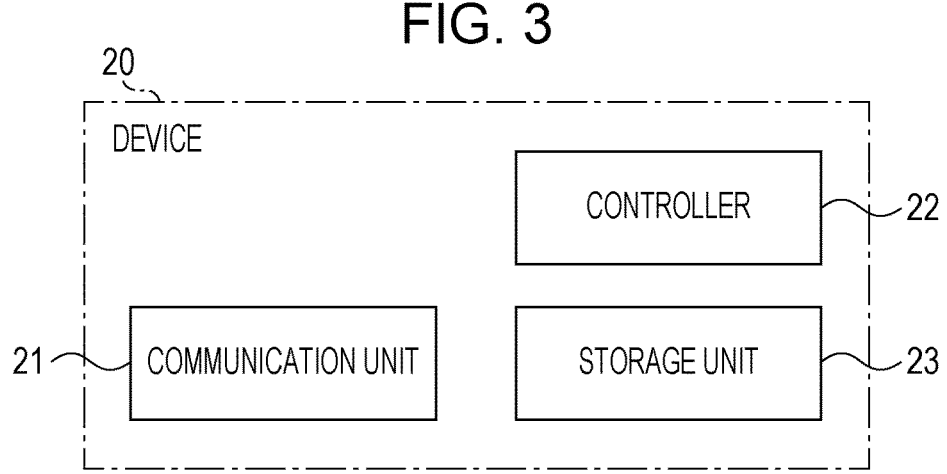
FIG. 3 is a block diagram of a device according to this exemplary embodiment.

FIG. 3 is a block diagram of a device 20 according to this exemplary embodiment. The device 20 has a communication unit 21, a controller 22, and a storage unit 23. The communication unit 21 is a communication interface having a function for communicating with the hub 10 or another device. The communication unit 21 may be a communication interface having a wired communication function, or may be a communication interface having a wireless communication function. Basically, the communication unit 21 has a communication interface according to the specifications of the device 20. The storage unit 23 has registered therein device execution information related to execution of a function requested from an information terminal, and the controller 22 controls the execution of a function included in the device 20 in accordance with the setting contents of the device execution information. The storage unit 23 is a storage device, such as an HDD or a memory (e.g., an SSD), and stores various types of application programs and various types of data. In this exemplary embodiment, the storage unit 23 stores therein device execution information, as mentioned above. Device execution information has registered therein an execution condition designated by a user who desires to use a function provided by the device 20, or at least an execution condition related to a function to be executed by the device 20. As an "execution condition", a condition related to the execution of a function is designated by the user. Specifically, an execution condition includes execution schedule information containing a function that the user desires to execute, as well as an execution period and an execution timing of the function. Moreover, device execution information contains data to be processed in the aforementioned function. The storage unit 23 may store not only currently-valid device execution information, but also past device execution information corresponding to past execution of the function as history information without deleting the past device execution information.

Figure 4:
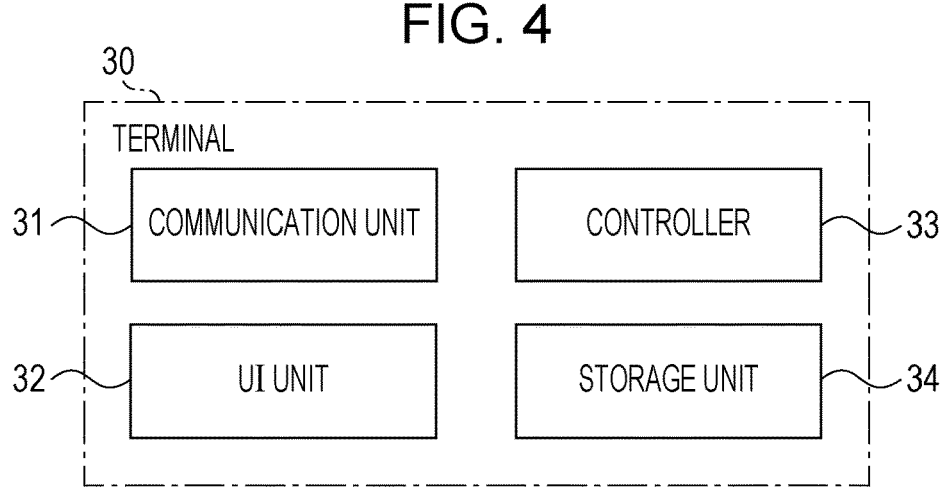
FIG. 4 is a block diagram of a terminal according to this exemplary embodiment.

FIG. 4 is a block diagram of a terminal 30 according to this exemplary embodiment. The terminal 30 in FIG. 4 corresponds to each of the first to fourth terminals in FIG. 1. Although the terminal 30 belongs to the device 20 shown in FIG. 2, the terminal 30 is shown separately from the device 20 that simply provides a function since the terminal 30 is capable of requesting the hub 10 for execution of a function for using the device 20. The terminal 30 has a communication unit 31, a user interface (UI) unit 32, a controller 33, and a storage unit 34. Components that are not used for describing this exemplary embodiment are omitted from FIG. 4.

The communication unit 31 is a communication interface having a function for communicating with the hub 10 or another device. The communication unit 31 may be a communication interface having a wireless communication function, or may be a communication interface having a wired communication function. For example, the communication unit 31 is compliant with one or more types of communication methods and may communicate with a communication partner in accordance with a communication method suitable for the communication partner (i.e., a communication method that the communication partner is compliant with). Examples of the communication methods include infrared communication, visible light communication, Wi-Fi communication, and short-range wireless communication. For example, the communication unit 21 may change the communication method or the frequency band in accordance with the communication partner, or may change the communication method or the frequency band in accordance with the surrounding environment. The UI unit 32 is a user interface and includes a display unit and an operable unit. The display unit is a display device, such as a liquid crystal display. The operable unit is an input device, such as a touchscreen or a keyboard. Alternatively, the UI unit 32 may be a user interface having both a display function and an operable function (e.g., a touchscreen display or a device that electronically displays a keyboard on a display). The controller 33 controls the operation of each component of the terminal 30. The storage unit 34 is a storage device, such as an HDD or a memory (e.g., an SSD), and stores various types of application programs and various types of data.

Next, the operation according to this exemplary embodiment will be described.

Figure 5:
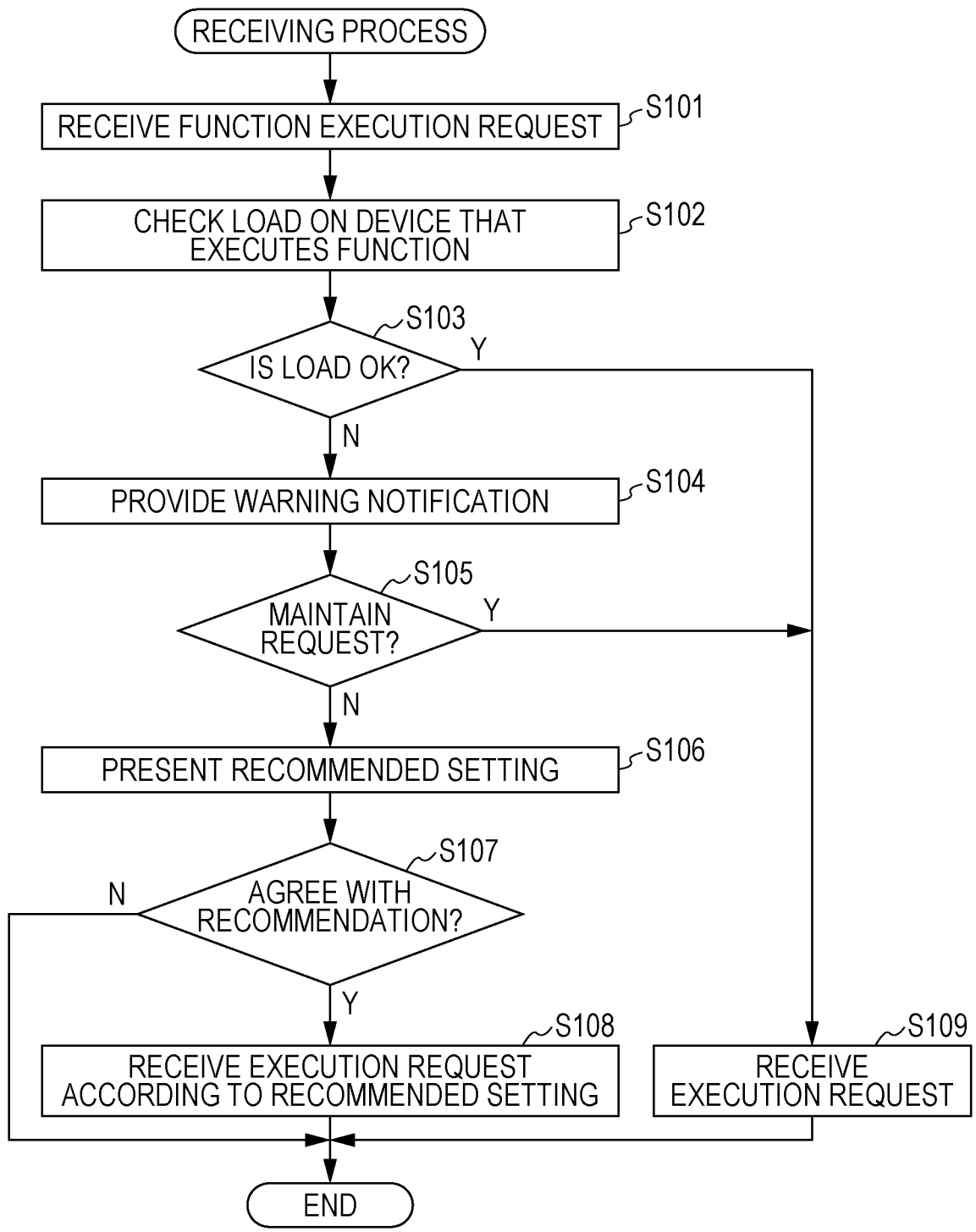
FIG. 5 is a flowchart illustrating a process of the hub according to this exemplary embodiment.

In this exemplary embodiment, in a case where the hub 10 and a device cooperate with each other and the device (such as the terminal 30) makes a request for execution of a function, the hub 10 receives the request, and the device 20 that is to execute the function designated by the request is requested to execute the function. The hub 10 controls the execution of the function in this manner. FIG. 5 is a flowchart illustrating a process of the hub 10 operating in response to a function execution request from a device (terminal 30), and FIG. 6 illustrates an example of a screen displayed on the display unit of the terminal 30 during the operation. The following description relates to the operation according to this exemplary embodiment when a first user makes a function execution request by using the first terminal.

The first user causes the first terminal to display a setting screen 41 by activating a predetermined application, and performs a setting process for executing a desired function via the setting screen 41. When the setting process is completed, the first user operates a predetermined enter button. The terminal 30 transmits the function execution request, including the setting contents, made by the first user to the hub 10 in accordance with the user operation.

When the receiving unit 11 in the hub 10 receives the execution request from the terminal 30 in step S101, the terminal 30 is caused to display a confirmation screen 42 for confirming the contents. The term "receives" in this case does not mean that a process to be performed based on an execution condition designated in the execution request is accepted, but means that the execution request is received (acquired).

The user may set a function for using a single device alone, or may set a cooperative function for realizing a series of functions by causing a mailing function, a printing function, and a storage function (transport function), which are respectively provided by the second PC receiving a mail, the first multifunction device performing a printing process, and the first robot used for storing a printed material, to operate in cooperation with one another, as in "PRINT OUT RECEIPT MAIL RECEIVED BY SECOND PC AND MAKE FIRST ROBOT STORE MAIL IN CABINET" shown in FIG. 6. Although "13:00 EVERY FRIDAY" is set as the execution period as an example, the function may be executed only once instead of being executed regularly. Moreover, the timing for starting the function may be set to a certain timeframe by designating a range from a certain time point to another time point.

Although FIG. 6 illustrates an example where the first user makes a request for starting the function at 13:00 every Friday, another user may have already made a request for executing a function using at least one of the second PC, the first multifunction device, and the first robot in the same time period (i.e., a time period overlapping the execution period), and each device may have already received the request. Furthermore, the first user himself/herself may perhaps make a request for executing a function using at least one of the second PC, the first multifunction device, and the first robot via the first terminal or via an information terminal, such as a PC, usable by the first user, other than the first terminal. In a case where a device executes a function concurrently by responding to execution requests made by multiple users (including a case where the same user makes multiple function execution requests), the amount of data handled is larger than in a case where the function is executed in response to a single execution request. As a result, the load on the device increases. For example, in a case where a device concurrently receives data from other multiple devices, the communication load on the device increases. If the load becomes excessive, there is a risk that the device may be unable to execute the function properly.

In this exemplary embodiment, when the user confirms the contents of the requested function via the confirmation screen 42 and selects an OK button, the controller 14 in the hub 10 checks the load status of each device that provides the requested function (i.e., a cooperative function in this example) in step S102.

For example, the device-information acquiring unit 12 acquires, from a device that is set to execute the function designated by the user, device execution information about the device. Then, based on the execution condition designated in the execution request, that is, at 13:00 every Friday in this example, the number of execution requests corresponding to that time is checked to determine how many execution requests the device is expected to handle. It is regarded that the larger the number, the higher the load. For higher accuracy, the amount of data to be processed in the execution request may be checked instead of the number of execution requests. It is regarded that the larger the amount of data to be handled, the higher the load. Since the load status is obtainable from the device execution information acquired by the device-information acquiring unit 12, the device execution information corresponds to load-related information. The device execution information acquired from the device may be stored in the storage unit 15 for a predetermined period. Since the same device execution information is not acquired again from the device, an increase in network load may be avoided.

Accordingly, the controller 14 confirms the load on the device that executes the function. If it is determined that the device has no potential to properly execute the function as a result of the increased amount of data to be handled by the device (NO in step S103), the controller 14 determines that it is difficult to provide the function requested by the user (i.e., the overall series of functions in the case of a cooperative function). In step S104, the receiving unit 11 provides a warning notification by causing the first terminal to display a warning screen 43 under the control of the controller 14. For example, in a case where the amount of data handled by the device determined from the device execution information exceeds a predetermined value, it is determined that the device has no potential to properly execute the function. The predetermined value may be determined from, for example, the specifications of the device, or the communication unit or communication method used for communication by the device.

By viewing the warning screen 43 displayed in the first terminal, the first user is notified of the possibility that the execution may be delayed or that proper execution is not possible under the execution condition set via the setting screen 41. While being notified of the possibility that the execution may be delayed or that proper execution is not possible, the first user selects a "YES" button if the first user desires that the function still be executed under the execution condition set via the setting screen 41. If the set function execution request is maintained regardless of the warning (YES in step S105), the receiving unit 11 causes the first terminal to display a reception completion screen 44 and notifies the first user that the execution condition set via the setting screen 41 is received. Then, in step S109, the controller 14 commands the corresponding device to execute the function under the execution condition set via the setting screen 41. In accordance with the example of the set function described above, the controller 14 commands the second PC to execute the mailing function so as to transmit a mail with a receipt attached thereto to the first multifunction device. The controller 14 also commands the first multifunction device to execute the printing function so as to print the receipt attached to the mail upon reception of the mail from the second PC. The controller 14 also commands the first robot to execute the storage function (transport function) so as to transport and store the receipt printed by the first multifunction device to a cabinet. Then, the controller 14 gives a command such that the above functions are executed at 13:00 every Friday. Because the first multifunction device and the first robot each have to wait until the upstream function is completed, it is necessary to give extra time to a certain extent to the execution start timing.

If the load on the device that provides the function is not excessive such that the device is expected to properly execute the function (YES in step S103), the receiving unit 11 causes the first terminal to display the reception completion screen 44 and notifies the first user that the execution condition set via the setting screen 41 is received. Then, in step S109, the controller 14 commands the corresponding device to execute the function under the execution condition set via the setting screen 41.

On the other hand, in order to avoid the delay or the inability of proper execution, the first user selects a "NO" button. In this case (NO in step S105), the controller 14 presents an execution condition under which the function is expected to be properly executable as a recommended setting. For example, similar to when the load status of the device is confirmed, the controller 14 causes the device-information acquiring unit 12 to acquire device execution information about a device that is set to execute a function designated by a user. If the device execution information is stored in the storage unit 15, the information is used. Then, within an execution period other than the execution condition designated in the execution request, that is, in an execution period other than 13:00 every Friday in this example, an execution period in which the number of execution requests is smaller than or equal to a predetermined number or in which the amount of data to be processed is smaller than or equal to a predetermined amount is searched for. The predetermined number and the predetermined amount are threshold values used for determining whether a function is expected to be properly executable, and may be determined from, for example, the specifications of the device, or the communication unit or communication method used for communication by the device. Alternatively, an execution period in which a function is expected to be properly executable may be searched for by referring to past device execution information (history information).

Although the above description focuses on the execution period when a recommended setting is to be planned, the device that is to execute the function may be changed. For example, a recommended setting that causes the second multifunction device to execute the function in place of the first multifunction device may be planned. Priority levels may be set for the execution period and the changing of the device. For example, for a device having no potential for properly executing a function, an execution period in which the device is expected to properly execute the function may be searched for, and if such an execution period is not found as a result of the search, the device may considerably be changed to another device. If a device has no potential for properly executing a function, the device may preferentially be changed to another device of the same type.

Accordingly, in step S106, the controller 14 plans an execution condition under which the function is expected to be properly executable, and presents the execution condition as a recommended setting. Specifically, the receiving unit 11 causes the first terminal 1 to display a recommendation screen 45 including the recommended setting.

The first user is notified of the recommended setting presented by the system by viewing the recommendation screen 45. If the first user agrees with the execution of the function based on the recommended setting, the first user selects the "OK" button. Accordingly, when the receiving unit 11 is informed that the first user has agreed with the recommended setting (YES in step S107), the receiving unit 11 causes the first terminal to display the reception completion screen 44 and notifies the first user that the function execution request based on the recommended setting has been received. Then, in step S108, the controller 14 commands the corresponding device to execute the function under the execution condition presented on the recommendation screen 45.

In contrast, if the first user does not agree with the recommended setting, the first user selects a "RESET" button, causes the first terminal to display the setting screen 41, and resets the function execution condition.

As described above, in this exemplary embodiment, if "NO" is selected on the warning screen 43 to avoid the delay or the inability of proper execution, the recommended setting is presented to the first user. Alternatively, the process may proceed to the setting screen 41 without presenting the recommended setting.

In the above description, the load status of a device is checked by referring to currently-valid or past device execution information. However, an indicator for determining the load status of a device is not limited to this. For example, the status of a hardware resource of a device, such as the usage rate of a CPU, the usage rate of a memory, or the available space in a storage unit of the device, may be taken into consideration.

If the communication load of a device becomes excessive due to handling of a large amount of communication data, the following operation may be performed instead of immediately determining that there is no potential for properly executing a function.

For example, if the communication load on a device becomes excessive due to a large amount of data transmitted from a hub to the device, the controller 14 performs control to change at least one of the amount of data to be transmitted to the device and a transmitting unit used for transmitting the data.

The method for changing (adjusting) the amount of data involves decimating or compressing the data to be transmitted, depending on the type of data. For example, if the data to be transmitted is a moving image, some of the frames are selectively transmitted instead of transmitting all of the frames. For example, frames are decimated every n frames (n≥2). Furthermore, if the data is not compressed yet, the data may be compressed before being transmitted. The amount of data to be transmitted is reduced in this manner so that the communication load is reduced.

In a case there are multiple communication units between a hub and a device, for example, if a wireless local area network (LAN) is used when both a wireless LAN and a wired LAN are usable for the connection, the communication unit (transmitting unit) is switched from the wireless LAN to the wired LAN that provides relatively higher communication speed, depending on the communication standard. Alternatively, by using both communication units, the amount of data transmittable at one time may be increased. If multiple communication units are to be used, a power saving configuration may be achieved by turning off the communication unit that is not to be used when it becomes unnecessary to use multiple communication units. The communication unit may be changed from a quality-oriented communication unit that transmits a smaller amount of data per unit time to a lower-quality communication unit that transmits a larger amount of data per unit time. If the currently-used communication method is Wi-Fi IEEE (Institute of Electrical and Electronics Engineers) 802.3a, the communication method may be changed to IEEE 802.3ac that provides relatively higher communication performance than the currently-used communication method.

Even when it is determined in step S102 that the load on the device is excessive based on the device execution information and that there is no potential for the device to properly execute the function, if the device is expected to properly execute the function by changing the transmitting unit or the communication method, as described above, the load status of the device may be determined as non-problematic and the process may proceed to step S104. Moreover, after an execution request is received, if the received execution request is not properly executable due to an increase in the communication load when the function is to be actually executed, such a situation may be dealt with by changing the transmitting unit or the communication method, as described above.

This exemplary embodiment is not limited to a case where a function provided by a single device is to be executed, as shown in FIG. 6, and may include a case where an execution request for a cooperative function in which functions provided by multiple devices are cooperatively executed is designated. For example, a cooperative function may be executed by cooperatively executing multiple functions included in a single device (e.g., the first multifunction device) or cooperatively executing multiple functions included in multiple devices (e.g., the second PC and the first multifunction device), as described above. Furthermore, a function included in a terminal device (i.e., the first terminal in this exemplary embodiment) giving an operation command may be used as a part of a cooperative function.

A cooperative function may be a function to be executed without using a device as hardware. For example, a cooperative function may be a function to be executed by causing multiple software programs installed in any of the devices to operate in cooperation with each other. Needless to say, a cooperative function may be a function to be executed by cooperatively executing a function included in a device as hardware and a function realized by a software program.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a receiving unit that receives an execution request for executing a function for using a device;
a notifying unit that provides a warning notification in a case where the function is not expected to be properly executable due to an increase in an amount of data handled by the device; and
a changing unit that changes at least one of the amount of data to be transmitted to the device and a transmitting unit to be used for transmitting the data to the device,
wherein the changing unit changes a current communication method of the transmitting unit to a communication method that provides higher communication performance than the current communication method.

2. The information processing device according to claim 1,
wherein, in a case where the function is not expected to be properly executable under an execution condition set when the execution request is made, the notifying unit presents an execution condition under which the function is expected to be properly executable as a recommended setting.

3. The information processing device according to claim 2, further comprising:
an acquiring unit that acquires information related to a function execution history of the device,
wherein the notifying unit presents the recommended setting based on the information acquired by the acquiring unit.

4. The information processing device according to claim 1,
wherein the case where the function is not expected to be properly executable includes a case where a load on the device exceeds a predetermined value.

5. The information processing device according to claim 4, further comprising;
an acquiring unit that acquires information related to the load on the device.

6. The information processing device according to claim 1,
wherein the device is connected to a network.

7. The information processing device according to claim 6,
wherein the function is a cooperative function used by a plurality of devices connected to the network.

8. The information processing device according to claim 6,
wherein the function is a cooperative function of a function provided by the device connected to the network and a function provided by any of information processing devices.

9. The information processing device according to claim 1,
wherein the changing unit changes the data by decimating or compressing the data and causes the transmitting unit to transmit the changed data.

10. An information processing device comprising:
a receiving unit that receives an execution request for executing a function for using a device;
a notifying unit that provides a warning notification in a case where the function is not expected to be properly executable due to an increase in an amount of data handled by the device; and
a changing unit that changes at least one of the amount of data to be transmitted to the device and a transmitting unit to be used for transmitting the data to the device,
wherein the changing unit changes from a first transmitting unit to a second transmitting unit for transmitting the data to the device, the second transmitting unit being a communication interface included in the information processing device and having a lower processing load than the first transmitting unit.

11. A non-transitory computer readable medium storing a program causing a computer to execute a process, the process comprising:
receiving an execution request for executing a function for using a device;
providing a warning notification in a case where the function is not expected to be properly executable due to an increase in an amount of data handled by the device;
changing at least one of the amount of data to be transmitted to the device and a transmitting unit to be used for transmitting the data to the device; and
changing a current communication method of the transmitting unit to a communication method that provides higher communication performance than the current communication method.

12. An information processing device comprising:
at least one processor programmed to:
- receive an execution request for executing a function for using a device;
- provide a warning notification in a case where the function is not expected to be properly executable due to an increase in an amount of data handled by the device;
- change at least one of the amount of data to be transmitted to the device and a communication interface to be used for transmitting the data to the device; and
- change a current communication method of the communication interface to a communication method that provides higher communication performance than the current communication method.

* * * * *